(12) United States Patent
Vervier et al.

(10) Patent No.: US 10,516,680 B1
(45) Date of Patent: Dec. 24, 2019

(54) SYSTEMS AND METHODS FOR ASSESSING CYBER RISKS USING INCIDENT-ORIGIN INFORMATION

(71) Applicant: Symantec Corporation, Mountain View, CA (US)

(72) Inventors: Pierre-Antoine Vervier, Alpes-Maritimes (FR); Leylya Bilge, Antibes (FR); Yufei Han, Antibes (FR); Matteo Dell'Amico, Valbonne (FR)

(73) Assignee: NortonLifeLock Inc., Tempe, AZ (US)

( * ) Notice: Subject to any disclaimer, the term of this patent is extended or adjusted under 35 U.S.C. 154(b) by 540 days.

(21) Appl. No.: 15/189,362

(22) Filed: Jun. 22, 2016

(51) Int. Cl.
*H04L 29/06* (2006.01)

(52) U.S. Cl.
CPC ...... *H04L 63/1416* (2013.01); *H04L 63/1425* (2013.01); *H04L 63/1433* (2013.01)

(58) Field of Classification Search
CPC ............. H04L 63/1416; H04L 63/1425; H04L 63/1433
See application file for complete search history.

(56) References Cited

U.S. PATENT DOCUMENTS

| | | | | |
|---|---|---|---|---|
| 9,129,029 | B1* | 9/2015 | Seth | G06F 16/24578 |
| 9,930,012 | B1* | 3/2018 | Clemons, Jr. | H04L 12/4625 |
| 2006/0212931 | A1* | 9/2006 | Shull | G06F 21/55 |
| | | | | 726/10 |
| 2006/0230039 | A1* | 10/2006 | Shull | H04L 63/08 |
| 2007/0118669 | A1* | 5/2007 | Rand | H04L 29/12066 |
| | | | | 709/245 |
| 2009/0006569 | A1* | 1/2009 | Morss | H04L 12/585 |
| | | | | 709/206 |
| 2014/0289862 | A1* | 9/2014 | Gorfein | G06F 21/10 |
| | | | | 726/26 |
| 2015/0172321 | A1* | 6/2015 | Kirti | H04L 63/20 |
| | | | | 726/1 |
| 2015/0319185 | A1* | 11/2015 | Kirti | H04L 63/1416 |
| | | | | 726/23 |

(Continued)

OTHER PUBLICATIONS

Yang Liu et al. Predicting Cyber Security Incidents Using Feature-Based Characterization of Network-Level Malicious Activities. In Proceedings of the 2015 ACM International Workshop on International Workshop on Security and Privacy Analytics (IWSPA '15). Mar. 4, 2015, 7 Pages.

(Continued)

*Primary Examiner* — Matthew T Henning
(74) *Attorney, Agent, or Firm* — FisherBroyles, LLP

(57) ABSTRACT

A computer-implemented method for assessing cyber risks using incident-origin information may include (1) receiving a request for a cyber-risk assessment of an entity of interest, (2) using an Internet-address data source that maps identifiers of entities to public Internet addresses of the entities to translate an identifier of the entity into a set of Internet addresses of the entity, (3) using an incident-origin data source that maps externally-detected security incidents to public Internet addresses from which the security incidents originated to translate the set of Internet addresses into a set of security incidents that originated from the entity, and (4) using the set of security incidents to generate the cyber-risk assessment of the entity. Various other methods, systems, and computer-readable media may have similar features.

20 Claims, 6 Drawing Sheets

(56) References Cited

U.S. PATENT DOCUMENTS

2016/0021141 A1* 1/2016 Liu ................... H04L 63/1433
                                                          726/23
2016/0028759 A1* 1/2016 Visbal ............... H04L 63/1441
                                                          726/22

OTHER PUBLICATIONS

Liu, Y., et al. (2015). Cloudy with a Chance of Breach: Forecasting Cyber Security Incidents. In USENIX Security Symposium, 16 Pages.

\* cited by examiner

SYSTEMS AND METHODS FOR ASSESSING CYBER RISKS USING INCIDENT-ORIGIN INFORMATION

BACKGROUND

Today, organizations are increasingly at risk of suffering security incidents, such as network intrusions that may lead to data breaches. Security incidents often have severe consequences on an organization's business operations and reputation. Many factors may impact an organization's risk of suffering a security incident. Such factors may include the general security hygiene of the organization's networks, whether or not computing devices in the organization's networks are have been or are currently compromised, and/or whether or not security measures are being appropriately taken to protect the organization's networks. Many of these factors may be controlled by a responsible organization in order to reduce the organization's cyber risk.

Unfortunately, security incidents that are suffered by an organization will often impact other entities that associate with the organization. Such entities may include customers, partners, members of the organization's supply chain, and/or entities that provide the organization with insurance that protects the organization from the risk of suffering financial losses that result when the organization suffers a security incident. Unfortunately, these impacted entities typically have little to no knowledge about how an organization manages its cyber risk and little to no knowledge about the overall security hygiene of the organization's networks. The instant disclosure, therefore, identifies and addresses a need for improved systems and methods for assessing the cyber risk of an organization or other entities.

SUMMARY

As will be described in greater detail below, the instant disclosure describes various systems and methods for assessing cyber risks using incident-origin information. In one example, a computer-implemented method for assessing cyber risks using incident-origin information may include (1) receiving a request for a cyber-risk assessment of an entity of interest (e.g., a business, organization, or a member of a supply chain), (2) using an Internet-address data source that maps identifiers of entities to public Internet addresses of the entities to translate an identifier of the entity into a set of Internet addresses of the entity, (3) using an incident-origin data source that maps externally-detected security incidents to public Internet addresses from which the security incidents originated to translate the set of Internet addresses into a set of security incidents that originated from the entity, and (4) using the set of security incidents to generate the cyber-risk assessment of the entity.

In some embodiments, the computer-implemented method may further include (1) receiving an additional request for a cyber-risk assessment of a supply chain of the entity, (2) using the Internet-address data source to translate an identifier of an additional entity that is a part of the supply chain of the entity into an additional set of Internet addresses of the additional entity, (3) using the incident-origin data source to translate the additional set of Internet addresses into an additional set of security incidents that originated from the additional entity, and (4) using the additional set of security incidents to generate the cyber-risk assessment of the supply chain of the entity. In at least one embodiment, the computer-implemented method may further include performing a security action based on the cyber-risk assessment of the entity.

In some embodiments, the step of using the set of security incidents may include (1) using the set of security incidents to calculate a cyber-risk score for the entity that indicates a relative probability that the entity will experience a future security incident. In some embodiments, the step of using the set of security incidents may include (1) counting a number of distinct Internet addresses from which members of the set of security incidents originated and (2) generating the cyber-risk assessment of the entity based on the number of distinct Internet addresses. In at least one embodiment, the step of using the set of security incidents may include (1) counting a number of security incidents within the set of security incidents and (2) generating the cyber-risk assessment of the entity based on the number of security incidents.

In some embodiments, the step of using the set of security incidents may include (1) calculating an amount of time during which members of the set of security incidents were observed and (2) generating the cyber-risk assessment of the entity based on the amount of time. In other embodiments, the step of using the set of security incidents may include (1) determining a severity of each member of the set of security incidents and (2) generating the cyber-risk assessment of the entity based on the severity of each member. In certain embodiments, the step of using the set of security incidents may include (1) counting a number of distinct Internet addresses within the set of Internet addresses of the entity and (2) generating the cyber-risk assessment of the entity based on the number of distinct Internet addresses.

In some embodiments, the incident-origin data source may include a spam-origin data source that maps externally-detected spam messages to public Internet addresses from which the spam messages originated, a botnet data source that identifies externally-detected zombies by public Internet address, a command-and-control data source that identifies externally-detected command-and-control servers by public Internet address, a malware data source that identifies externally-detected malware servers by public Internet address, a phishing data source that identifies externally-detected phishing servers by public Internet address, a malicious-scan data source that maps externally-detected malicious scanning activities to public Internet addresses from which the malicious scanning activities originated, a login-attack data source that maps externally-detected brute-force login attacks to public Internet addresses from which the brute-force login attacks originated, and/or a hijack-attack data source that maps externally-detected border-gateway-protocol hijack attacks to public Internet addresses from which the border-gateway-protocol hijack attacks originated.

In one embodiment, a system for implementing the above-described method may include (1) a request-receiving module, stored in memory, that receives a request for a cyber-risk assessment of an entity of interest, (2) an identifier-translating module, stored in memory, that uses an Internet-address data source that maps identifiers of entities to public Internet addresses of the entities to translate an identifier of the entity into a set of Internet addresses of the entity, (3) an address-translating module, stored in memory, that uses an incident-origin data source that maps externally-detected security incidents to public Internet addresses from which the security incidents originated to translate the set of Internet addresses into a set of externally-detected security incidents that originated from the entity, (4) a risk-assessing module, stored in memory, that uses the set of security incidents to generate the cyber-risk assessment of the entity, and (5) at least one processor that executes the request-receiving module, the identifier-translating module, the address-translating module, and the risk-assessing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive a request for a cyber-risk assessment of an entity of interest, (2) use an Internet-address data source that maps identifiers of entities to public Internet addresses of the entities to translate an identifier of the entity into a set of Internet addresses of the entity, (3) use an incident-origin data source that maps externally-detected security incidents to public Internet addresses from which the security incidents originated to translate the set of Internet addresses into a set of externally-detected security incidents that originated from the entity, and (4) use the set of security incidents to generate the cyber-risk assessment of the entity.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
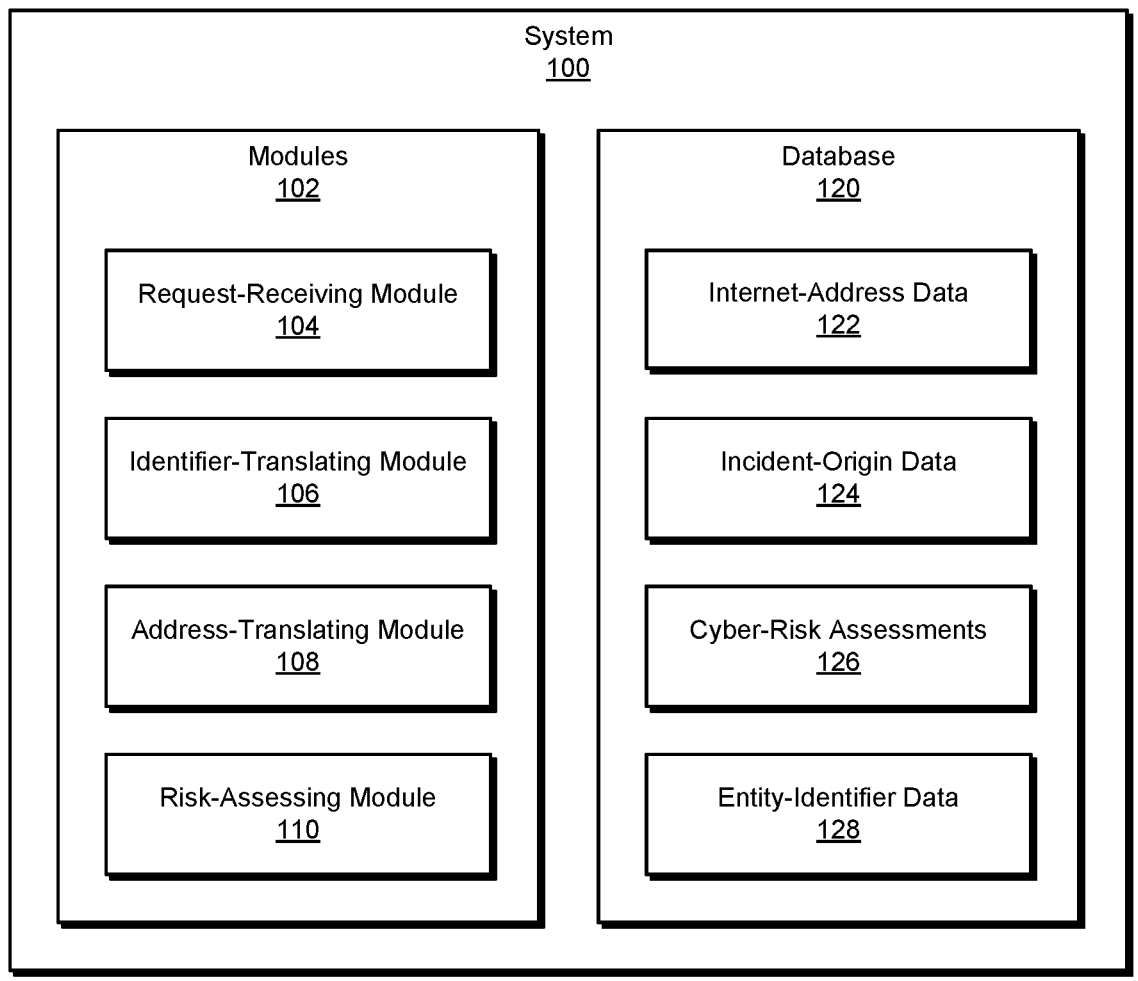
FIG. 1 is a block diagram of an exemplary system for assessing cyber risks using incident-origin information.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for assessing cyber risks using incident-origin information. As will be explained in greater detail below, by using outside-in data sources that contain an outsider's view of the security incidents suffered by an arbitrary entity's networks, these systems and methods may enable the cyber risk and/or the security hygiene of the entity to be accurately assessed in a way that does not rely on insider information about the entity, the overall security hygiene of the entity's networks, and/or how the entity manages its cyber risk. Moreover, by enabling the cyber risk and/or the security hygiene of an entity to be accurately assessed in a way that does not rely on the entity's involvement or cooperation, the systems and methods described herein may enable other entities that associate with the entity to better understand their exposure to the entity's cyber risk. Embodiments of the instant disclosure may also provide various other advantages and features, as discussed in greater detail below.

Figure 2:
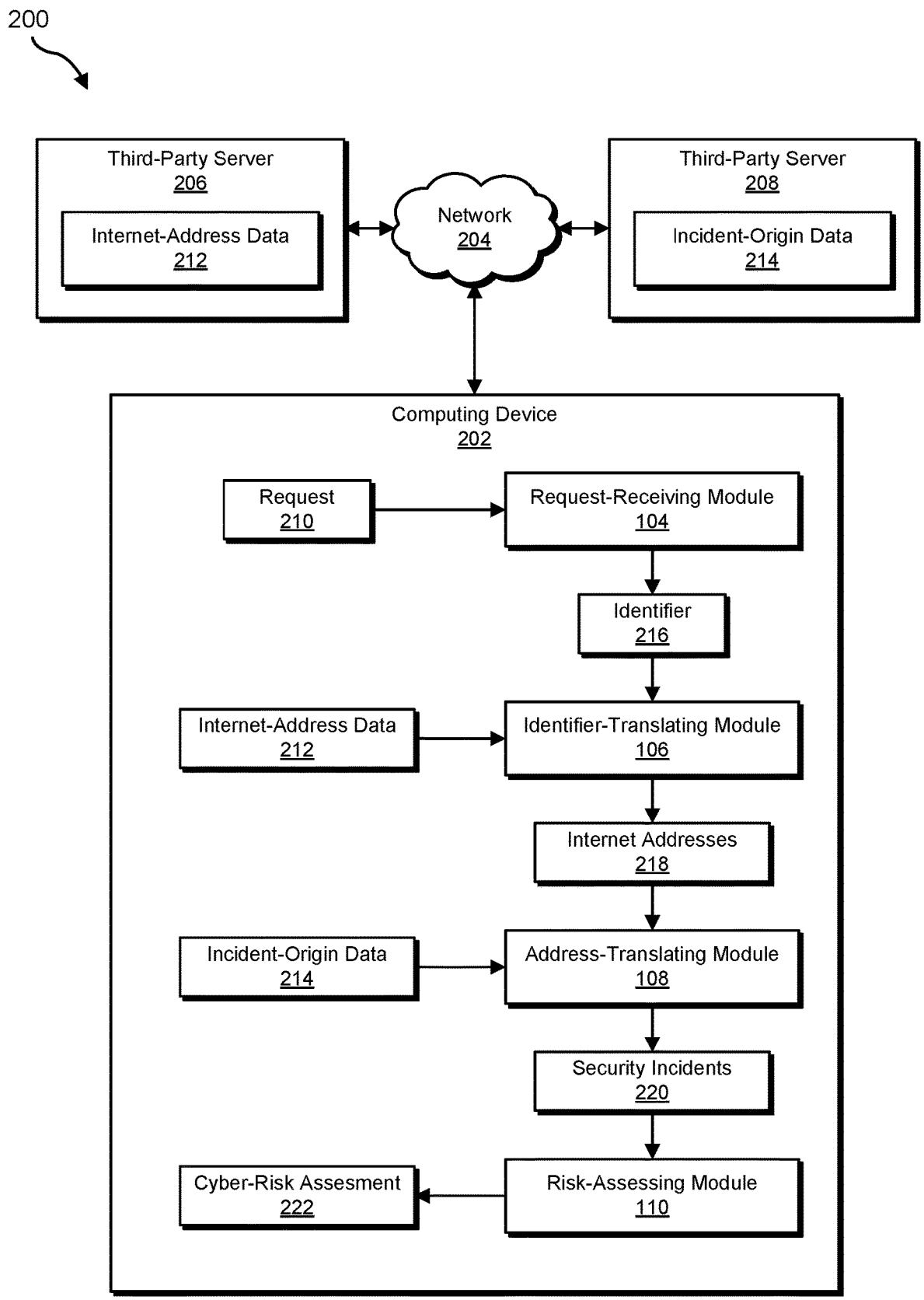
FIG. 2 is a block diagram of an additional exemplary system for assessing cyber risks using incident-origin information.

The following will provide, with reference to FIGS. 1-2, detailed descriptions of exemplary systems for assessing cyber risks using incident-origin information. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for assessing cyber risks using incident-origin information. As illustrated in this figure, exemplary system 100 may include one or more modules 102 for performing one or more tasks. For example, and as will be explained in greater detail below, exemplary system 100 may include a request-receiving module 104 that may receive a request for a cyber-risk assessment of an entity of interest. Exemplary system 100 may also include an identifier-translating module 106 that may use an Internet-address data source that maps identifiers of entities to public Internet addresses of the entities to translate an identifier of the entity into a set of Internet addresses of the entity.

In addition, and as will be described in greater detail below, exemplary system 100 may include an address-translating module 108 that may use an incident-origin data source that maps externally-detected security incidents to public Internet addresses from which the security incidents originated to translate the set of Internet addresses into a set of externally-detected security incidents that originated from the entity. Exemplary system 100 may also include a risk-assessing module 110 that may use the set of security incidents to generate the cyber-risk assessment of the entity. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include Internet-address data 122 for storing information that associates identifiers of entities to their public Internet addresses, incident-origin data 124 for storing information about externally-detected security incidents (e.g., types of the security incidents, severities of the security incidents, and/or the public Internet addresses from which the security incidents originated), cyber-risk assessments 126 for storing assessments of entities' cyber risks, and entity-identifier data 128 for storing information about entities' identifiers (e.g., names, domain names, identification numbers, and/or physical addresses).

Database 120 may represent portions of a single database or computing device or a plurality of databases or computing devices. For example, database 120 may represent a portion of computing device 202 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as computing device 202 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202, a third-party server 206, and a third-party server 208 in communication via a network 204. In one example, computing device 202 may be programmed with one or more of modules 102 and/or may store all or a portion of the data in database 120.

In one embodiment, one or more of modules 102 from FIG. 1 may, when executed by at least one processor of computing device 202, enable computing device 202 to generate cyber-risk assessments using incident-origin information. For example, and as will be described in greater detail below, one or more of modules 102 may cause computing device 202 to (1) receive a request 210 for a cyber-risk assessment of an entity of interest, (2) use Internet-address data 212 that maps identifiers of entities to public Internet addresses of the entities to translate an identifier 216 of the entity into Internet addresses 218 of the entity, (3) use incident-origin data 214 that maps externally-detected security incidents to public Internet addresses from which the security incidents originated to translate Internet addresses 218 into externally-detected security incidents 220 that originated from the entity, and (4) use security incidents 220 to generate a cyber-risk assessment 222 for the entity.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Third-party servers 206 and 208 generally represent any type or form of computing device that is capable of collecting or hosting Internet-address data and/or incident-origin data. Examples of third-party servers 206 and 208 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202, third-party server 206, and third-party server 208.

Figure 3:
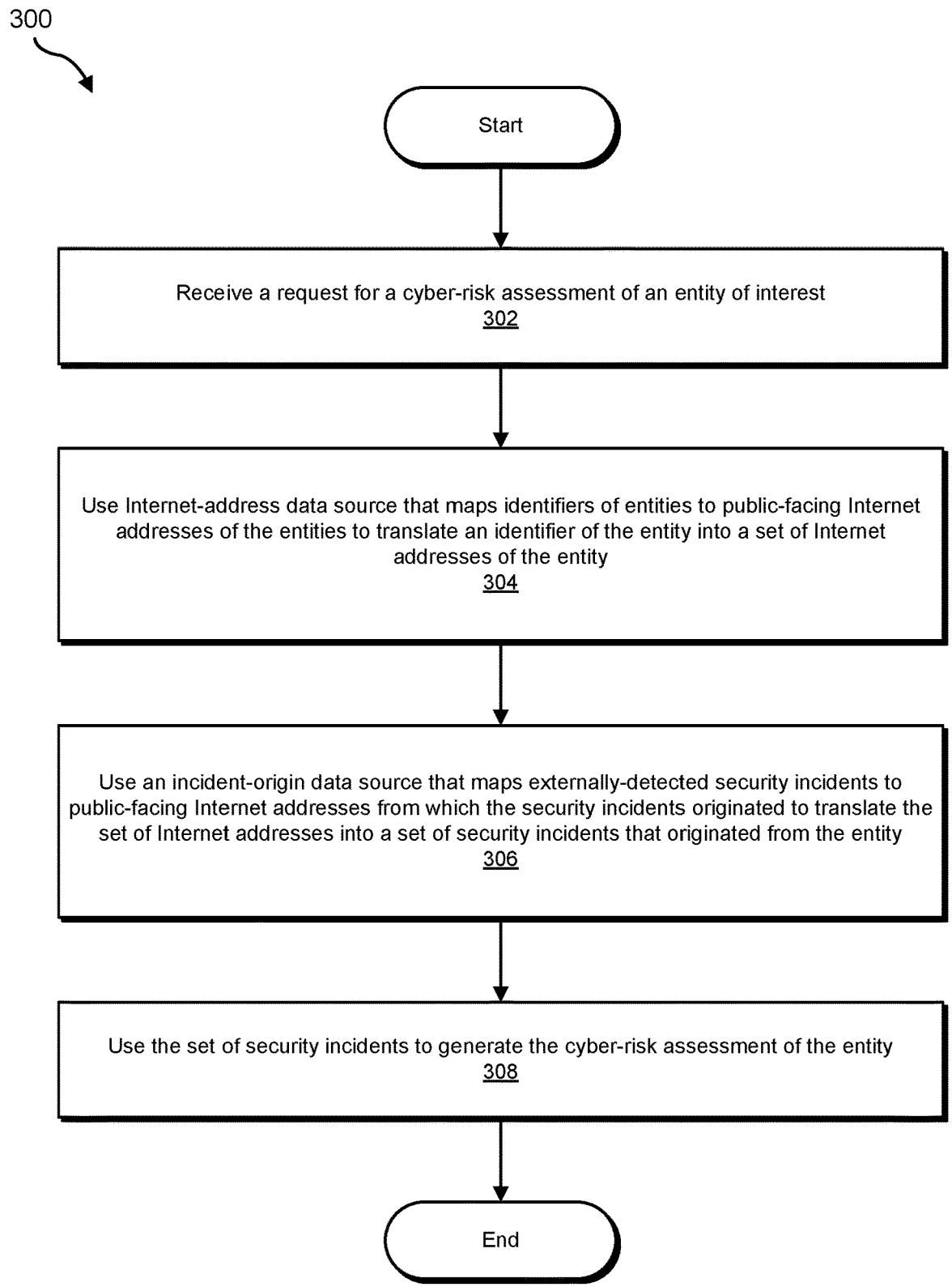
FIG. 3 is a flow diagram of an exemplary method for assessing cyber risks using incident-origin information.

FIG. 3 is a flow diagram of an exemplary computer-implemented method 300 for assessing cyber risks using incident-origin information. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302, one or more of the systems described herein may receive a request for a cyber-risk assessment of an entity of interest. For example, request-receiving module 104 may, as part of computing device 202 in FIG. 2, receive request 210 for a cyber-risk assessment of an entity of interest.

As used herein, the term "entity" generally refers to any corporation, organization, business, enterprise, partnership, association, group, or individual whose network, networks, and/or computing systems may (1) be involved in a security incident and (2) be identified by or addressed using public Internet addresses (e.g., Internet-Protocol (IP) addresses or domain names). Additionally or alternatively, the term "entity" may refer to all or a portion of a network that may (1) be involved in a security incident and (2) be identified by or addressed using a public Internet address. The term "cyber-risk assessment," as used herein generally refers to any assessment of an entity's risk of suffering a future security incident (e.g., a data breach). In some examples, a cyber-risk assessment may include a cyber-risk score or classification that indicates a relative probability that the entity will experience a future security incident.

Request-receiving module 104 may receive requests for cyber-risk assessments from a variety of interested parties that may wish to understand the cyber risk of an entity. For example, a customer, partner, insurer, or any other entity that is involved with an entity may wish to know the risk that the entity will suffer a future security incident. In many situations, an interested party may have little to no knowledge about how an entity manages its cyber risk and/or little to no knowledge about the overall security hygiene of the entity's networks. However, the interested party may know of one or more identifiers of the entity, which request-receiving module 104 may receive from the interested party as part of the interested party's request for a cyber-risk assessment of the entity. As used herein, the term "identifier" generally refers to any information that may be used to identify, reference, or distinguish an entity. Examples of entity identifiers may include, without limitation, legal names, business names, trade names, trademarks, domain names, brand names, colloquial names, addresses, Points of Contact (POCs), and identification numbers.

At step 304, one or more of the systems described herein may use an Internet-address data source that maps identifiers of entities to public Internet addresses of the entities to translate an identifier of the entity into a set of Internet addresses of the entity. For example, identifier-translating module 106 may, as part of computing device 202 in FIG. 2, use Internet-address data 212 to translate identifier 216 into Internet addresses 218.

As used herein, the term "Internet-address data source" generally refers to any resource or collection of information that partially or completely associates or connects the identifiers of entities to their public or Internet-facing Internet addresses. Examples of Internet-address data sources include, without limitation, Internet routing registries, Internet resource allocation records, and Domain Name System (DNS) databases. In some examples, the term "Internet-address data source" may refer to any database maintained by a Local Internet Registry (LIR) or a Regional Internet Registry (RIR) (e.g., African Network Information Center (AFRINIC), American Registry for Internet Numbers (ARIN), Asia-Pacific Network Information Centre (APNIC), Latin America and Caribbean Network Information Centre (LACNIC), or Réseaux IP Européens Network Coordination Centre (RIPE NCC)).

The systems described herein may perform step 304 in any suitable manner. In some examples, an Internet-address data source may, by itself, map identifiers of the type received at step 302 to public Internet addresses. In these examples, identifier-translating module 106 may use the identifier received at step 302 to query the Internet-address data source for all public Internet addresses connected to the identifier.

In some examples, an Internet-address data source may map identifiers to public Internet addresses that are not of the type received at step 302. For example, an Internet-address data source may map domain names to public Internet addresses, but a brand name may have been received at step 302. Additionally or alternatively, an Internet-address data source may map other identifiers of an entity to public Internet addresses in addition to or as an alternative to the identifier received at step 302. For example, an Internet-address data source may map two or more domain names of an entity to public Internet addresses, and/or an Internet-address data source may map identifiers of a parent company and identifiers of the parent company's subsidiaries to public Internet addresses. In examples such as these, identifier-translating module 106 may use an identifier data source that maps identifiers of an entity to other identifiers of the same entity to translate the identifier received at step 302 into an additional identifier that may then be used to query an appropriate Internet-address data source for all public Internet addresses connected to the entity.

Figure 4:
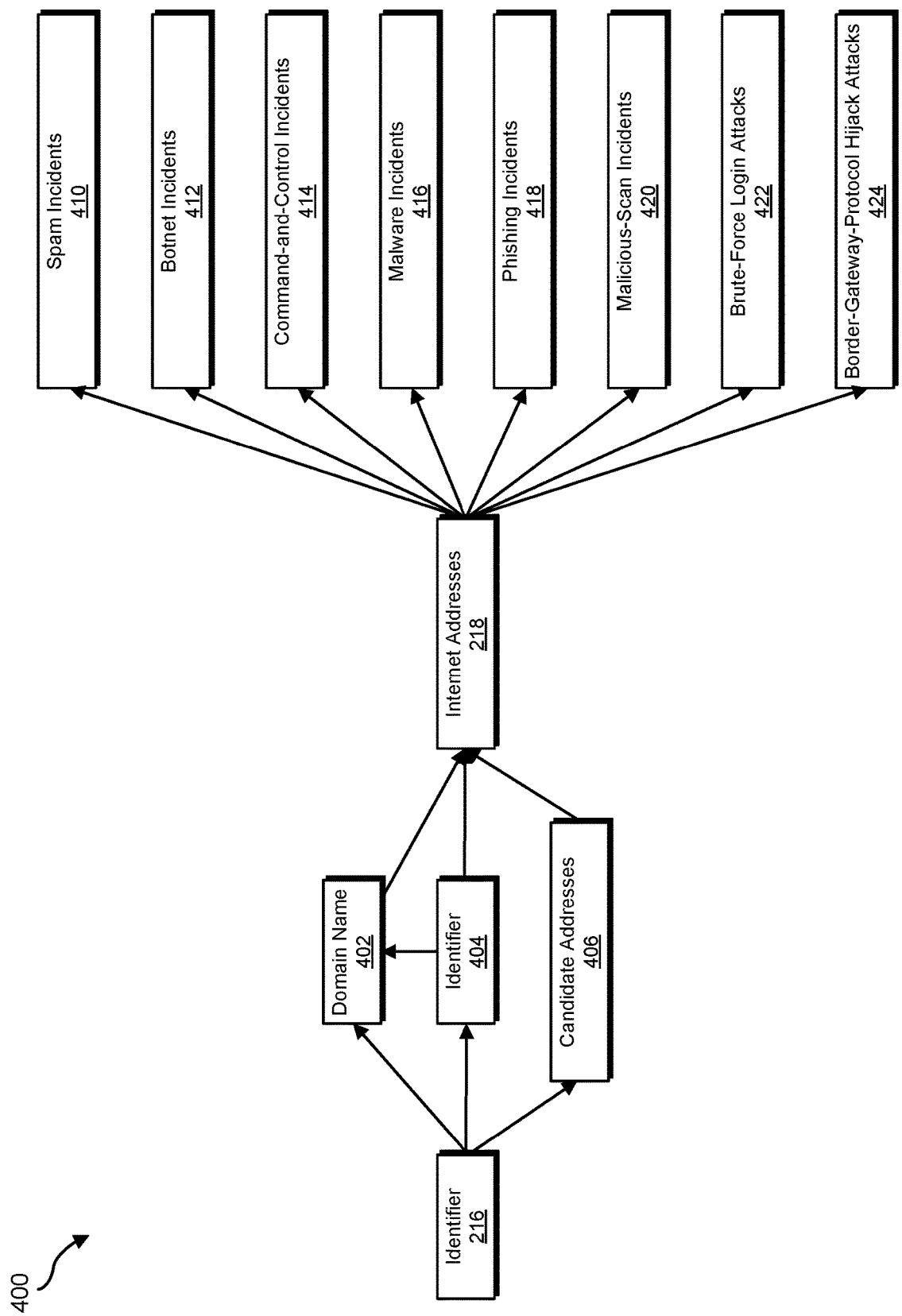
FIG. 4 is a flow diagram of an exemplary transformation of an identifier of an entity into a set of security incidents that originated from the entity.

Using FIG. 4 as an example, identifier-translating module 106 may use an identifier data source that maps entity identifiers to domain names to translate identifier 216 into domain name 402 that may then be used to query an appropriate Internet-address data source for some or all of Internet addresses 218. Additionally or alternatively, identifier-translating module 106 may use an identifier data source that maps entity identifiers to other entity identifiers to translate identifier 216 into identifier 404 that may then be used to query an appropriate Internet-address data source for some or all of Internet addresses 218.

In some examples, an identifier received at step 302 may be associated with more than one entity. For example, many entities may share the same or similar business or brand names. In examples such as these, identifier-translating module 106 may use the identifier received at step 302 to query an Internet-address data source for all public Internet addresses connected to the identifier. Identifier-translating module 106 may then use any additional information that is known about the entity (e.g., a legal name or address of the entity) to select only those public Internet addresses that are the entity's from the identified public Internet addresses. Using FIG. 4 as an example, identifier-translating module 106 may use an Internet-address data source that maps entity identifiers to public Internet addresses to translate identifier 216 into candidate addresses 406. Identifier-translating module 106 may then use any additional information that is known about the entity of which identifier 216 belongs to select Internet addresses 218 from candidate addresses 406.

At step 306, one or more of the systems described herein may use an incident-origin data source that maps externally-detected security incidents to public Internet addresses from which the security incidents originated to translate the set of Internet addresses into a set of externally-detected security incidents that originated from the entity. For example, address-translating module 108 may, as part of computing device 202 in FIG. 2, use incident-origin data 214 to translate Internet addresses 218 into security incidents 220.

As used herein, the term "security incident" generally refers to any occurrence or outcome of an action or situation that threatens information or computer security. Examples of security incidents may include, without limitation, incidents involving spam emissions, botnet infections, command-and-control servers, malware, phishing activities, malicious scanning activities (e.g., host scanning or vulnerability scanning), brute-force login attacks, border-gateway-protocol hijack attacks, Denial-of-Service (DoS) attacks, or Remote-Code-Execution (RCE) attacks. A security incident may be detected from inside or from outside of the network from which the security incident originated. The term "externally-detected security incident," as used herein, generally refers to any security incident that was detected from outside of the network in which the security incident originated.

As used herein, the term "incident-origin data source" generally refers to any resource or collection of information that provides an external view of an entity's security hygiene and that partially or completely associates or connects externally-detected security incidents to the public Internet addresses from which the security incidents originated. Examples of incident-origin data sources include, without limitation, spam-origin data sources that associate externally-detected spam messages with the public Internet addresses from which the spam messages originated, botnet data sources that reference externally-detected zombies by public Internet address, command-and-control data sources that reference externally-detected command-and-control servers by public Internet address, malware data sources that reference externally-detected security incident by public Internet address, phishing data sources that reference externally-detected phishing servers by public Internet address, malicious-scan data sources that associate externally-detected malicious scanning activities with the public Internet addresses from which the malicious scanning activities originated, login-attack data sources that associate externally-detected brute-force login attacks with the public Internet addresses from which the brute-force login attacks originated, and/or hijack-attack data sources that associate externally-detected border-gateway-protocol hijack attacks with the public Internet addresses from which the border-gateway-protocol hijack attacks originated.

The systems described herein may perform step 306 in any suitable manner. In some examples, an incident-origin data source may, by itself, map public Internet addresses of the type collected at step 304 to externally-detected security incidents. In these examples, address-translating module 108 may use each of the public Internet addresses collected at step 304 to query the incident-origin data source for all security incidents connected to the public Internet address. In some examples, address-translating module 108 may query the incident-origin data source for only security incidents that occurred during a particular period of time.

In some examples, an incident-origin data source may map public Internet addresses that are not of the type collected at step 304 to security incidents. For example, an incident-origin data source may map domain names to security incidents, but an IP address may have been collected at step 304. In these examples, address-translating module 108 may use an identifier data source that maps public Internet addresses of an entity to other public Internet addresses of the same entity to translate a public Internet address collected at step 304 into an additional public Internet address that may then be used to query an appropriate incident-origin data source for all security incidents connected to the additional public Internet address.

At step 308, one or more of the systems described herein may use the set of security incidents to generate the cyber-risk assessment of the entity. For example, risk-assessing module 110 may, as part of computing device 202 in FIG. 2, use security incidents 220 to generate the cyber-risk assessment requested at step 302.

The systems described herein may use information about the security incidents that have originated from an entity to assess the entity's cyber risk in a variety of ways. For example, risk-assessing module 110 may use the security incidents of an entity to calculate a cyber-risk score or classification for the entity that may indicate a relative probability that the entity will experience a future security incident and/or that may estimate the entity's security hygiene. In some examples, risk-assessing module 110 may calculate a numerical cyber-risk score between 0 and 1 for the entity where a lower score may indicate a relatively lower risk that the entity will experience a future security incident and a higher score may indicate a relatively higher risk that the entity will experience a future security incident.

In some examples, risk-assessing module 110 may derive various metrics from the security incidents of an entity and use the derived metrics to assess the entity's cyber risk. In one example, risk-assessing module 110 may count the number of distinct Internet addresses from which the entity's security incidents originated and may adjust the entity's cyber risk score accordingly. If the number is high relative to that of other entities or if the number is high relative to the number of distinct Internet addresses of the entity, risk-assessing module 110 may assign a higher relative risk score to the entity. Alternatively, if the number is low relative to that of other entities or if the number is low relative to the number of distinct Internet addresses of the entity, risk-assessing module 110 may assign a lower relative risk score to the entity.

In some examples, risk-assessing module 110 may derive various temporal metrics from the security incidents of an entity and use the derived temporal metrics to calculate the entity's cyber-risk score. In some examples, risk-assessing module 110 may calculate the amount of time during which the entity's security incidents were observed (e.g., over a predetermined time period) and may adjust the entity's cyber risk score accordingly. If the amount of time is high relative to that of other entities, risk-assessing module 110 may assign a higher relative risk score to the entity. Alternatively, if the amount of time is low relative to that of other entities, risk-assessing module 110 may assign a lower relative risk score to the entity.

In some situations, an entity may be associated with other entities whose cyber risk may impact the entity's own cyber risk. For example, the cyber risks of members of an entity's supply chain may impact the cyber risk of the entity. For at least this reason, risk-assessing module 110 may assess the cyber risk of an entity based on the cyber-risk assessments of other entities with which the entity associates. Upon completion of step 308, exemplary method 300 in FIG. 3 may terminate.

As explained above, by using outside-in data sources that contain an outsider's view of the security incidents suffered by an arbitrary entity's networks, these systems and methods may enable the cyber risk and/or the security hygiene of the entity to be accurately assessed in a way that does not rely on insider information about the entity, the overall security hygiene of the entity's networks, and/or how the entity manages its cyber risk. Moreover, by enabling the cyber risk and/or the security hygiene of an entity to be accurately assessed in a way that does not rely on the entity's involvement or cooperation, the systems and methods described herein may enable other entities that associate with the entity to better understand their exposure to the entity's cyber risk.

Figure 5:
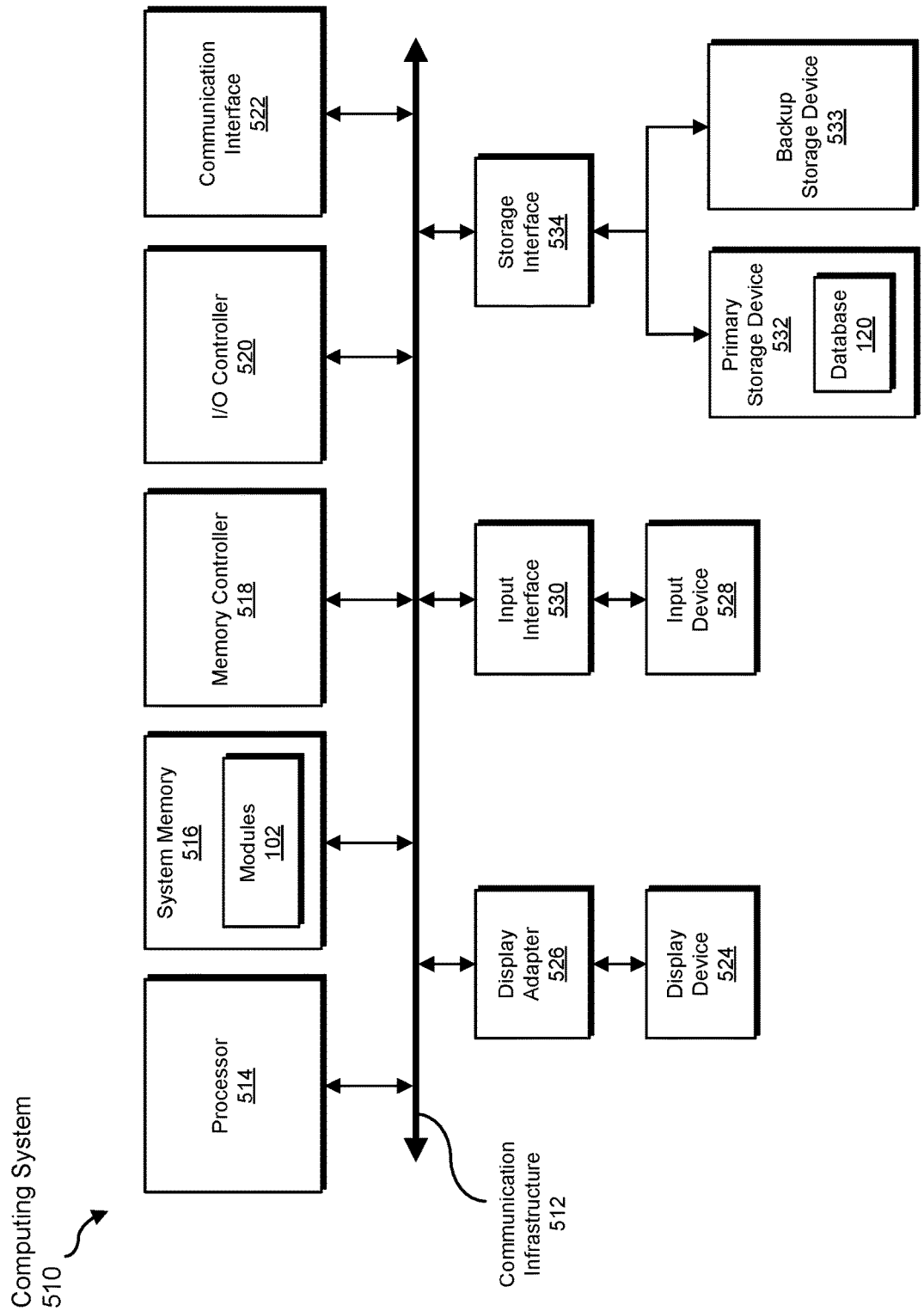
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
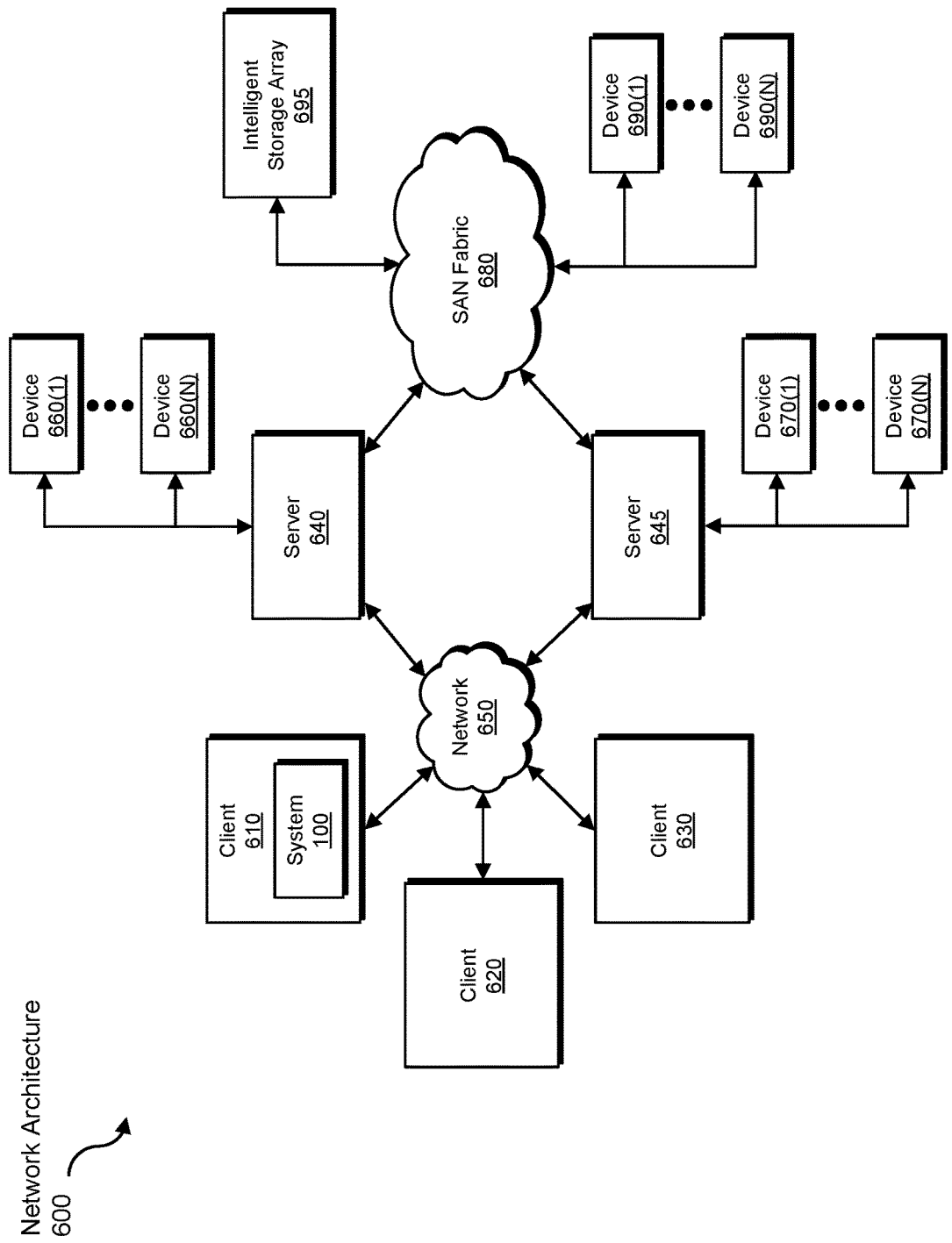
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for assessing cyber risks using incident-origin information.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants).

One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an identifier (e.g., a business name or a domain name) of an entity to be transformed, transform the identifier into a list of the entity's Internet addresses, transform the list of the entity's Internet addresses into a list of security incidents that originated from the entity's network, output a result of the transformations to a system that is capable of assessing the entity's cyber risk based on the list of security incidents, use the result of the transformations to assess the entity's cyber risk, and store the result of the transformations to a cyber-risk information database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for assessing cyber risks using incident-origin information, at least a portion of the method being performed by at least one computing device comprising at least one processor, the method comprising:
   receiving, by the at least one computing device, a request to perform a security action based on a security hygiene of a private network of an organization of interest, wherein:
      the request comprises an offline identifier of the organization; and
      the private network comprises a plurality of computing devices whose public Internet addresses are unknown to the at least one computing device when the request is received;
   using, by the at least one computing device, at least one Internet-address data source that maps offline identifiers of organizations to public Internet addresses of the organizations to translate the offline identifier of the organization into a set of candidate public Internet addresses that are likely to be the public Internet addresses of the plurality of computing devices;
   using, by the at least one computing device, at least one incident-origin data source that maps externally-detected security incidents to public Internet addresses from which the security incidents originated to translate the set of candidate public Internet addresses into a set of security incidents that likely originated from the private network of the organization;
   using, by the at least one computing device, the set of security incidents to estimate the security hygiene of the private network; and
   performing, by the at least one computing device, the security action based on the estimated security hygiene.

2. The computer-implemented method of claim 1, further comprising:
   receiving an additional request for a security hygiene of a supply chain of the organization;
   using the Internet-address data source to translate an offline identifier of at least one additional organization that is a part of the supply chain of the organization into an additional set of candidate public Internet addresses that are likely to be public Internet addresses of an additional plurality of computing devices in an additional private network of the additional organization;
   using the incident-origin data source to translate the additional set of candidate public Internet addresses into an additional set of security incidents that likely originated from the additional private network of the additional organization; and
   using the additional set of security incidents to generate the security hygiene of the supply chain of the organization.

3. The computer-implemented method of claim 1, wherein performing the security action comprises calculating a cyber-risk score for the organization that indicates a relative probability that the private network of the organization will experience a future security incident.

4. The computer-implemented method of claim 1, wherein using the set of security incidents comprises:
   counting a number of distinct Internet addresses from which members of the set of security incidents originated;
   estimating the security hygiene of the organization based at least in part on the number of distinct Internet addresses.

5. The computer-implemented method of claim 1, wherein using the set of security incidents comprises:
   counting a number of security incidents within the set of security incidents;
   estimating the security hygiene of the organization based at least in part on the number of security incidents.

6. The computer-implemented method of claim 1, wherein using the set of security incidents comprises:
   calculating an amount of time during which members of the set of security incidents were observed;
   estimating the security hygiene of the organization based at least in part on the amount of time.

7. The computer-implemented method of claim 1, wherein using the set of security incidents comprises:
   determining a severity of each member of the set of security incidents;
   estimating the security hygiene of the organization based at least in part on the severity of each member.

8. The computer-implemented method of claim 1, wherein using the set of security incidents comprises:
   counting a number of distinct Internet addresses within the set of public Internet addresses;
   estimating the security hygiene of the organization based at least in part on the number of distinct Internet addresses.

9. The computer-implemented method of claim 1, wherein the incident-origin data source comprises a spam-origin data source that maps externally-detected spam messages to public Internet addresses from which the spam messages originated.

10. The computer-implemented method of claim 1, wherein the incident-origin data source comprises a botnet data source that identifies externally-detected zombies by public Internet address.

11. The computer-implemented method of claim 1, wherein the incident-origin data source comprises a command-and-control data source that identifies externally-detected command-and-control servers by public Internet address.

12. The computer-implemented method of claim 1, wherein the incident-origin data source comprises a malware data source that identifies externally-detected malware servers by public Internet address.

13. The computer-implemented method of claim 1, wherein the incident-origin data source comprises a phishing data source that identifies externally-detected phishing servers by public Internet address.

14. The computer-implemented method of claim 1, wherein the incident-origin data source comprises a malicious-scan data source that maps externally-detected malicious scanning activities to public Internet addresses from which the malicious scanning activities originated.

15. The computer-implemented method of claim 1, wherein the incident-origin data source comprises a login-attack data source that maps externally-detected brute-force login attacks to public Internet addresses from which the brute-force login attacks originated.

16. The computer-implemented method of claim 1, wherein the incident-origin data source comprises a hijack-attack data source that maps externally-detected border-gateway-protocol hijack attacks to public Internet addresses from which the border-gateway-protocol hijack attacks originated.

17. The computer-implemented method of claim 1, wherein the offline identifier comprises one or more of:
   a legal name of the organization;
   a business name of the organization; and
   a trade name of the organization.

18. A system for assessing cyber risks using incident-origin information, the system comprising:
   a request-receiving module, stored in memory, that receives a request for a security hygiene of a private network of an organization of interest, wherein:
      the request comprises an offline identifier of the organization; and
      the private network comprises a plurality of computing devices whose public Internet addresses are unknown to the system when the request is received;
   an identifier-translating module, stored in memory, that uses at least one Internet-address data source that maps offline identifiers of organizations to public Internet addresses of the organizations to translate the offline identifier of the organization into a set of candidate public Internet addresses that are likely to be the public Internet addresses of the plurality of computing devices in the private network of the organization;
   an address-translating module, stored in memory, that uses at least one incident-origin data source that maps externally-detected security incidents to public Internet addresses from which the security incidents originated to translate the set of candidate public Internet addresses into a set of security incidents that likely originated from the private network of the organization;
   a risk-assessing module, stored in memory, that uses the set of security incidents to estimate the security hygiene of the private network; and
   at least one processor that executes the request-receiving module, the identifier-translating module, the address-translating module, and the risk-assessing module.

19. The system of claim 18, wherein:
   the request-receiving module further receives an additional request for a security hygiene of a supply chain of the organization;
   the identifier-translating module further uses the Internet-address data source to translate an offline identifier of at least one additional organization that is a part of the supply chain of the organization into an additional set of candidate public Internet addresses that are likely to be public Internet addresses of an additional plurality of computing devices in an additional private network of the additional organization;
   the address-translating module further uses the incident-origin data source to translate the additional set of candidate public Internet addresses into an additional set of security incidents that likely originated from the additional private network of the additional organization; and
   the risk-assessing module further uses the additional set of security incidents to generate the security hygiene of the supply chain of the organization.

20. A non-transitory computer-readable medium comprising one or more computer-executable instructions that, when executed by at least one processor of at least one computing device, cause the at least one computing device to:
   receive a request to perform a security action based on a security hygiene of a private network of an organization of interest, wherein:
      the request comprises an offline identifier of the organization; and
      the private network comprises a plurality of computing devices whose public Internet addresses are unknown to the at least one computing device when the request is received;
   use at least one Internet-address data source that maps offline identifiers of organizations to public Internet addresses of the organizations to translate the offline identifier of the organization into a set of candidate public Internet addresses that are likely to be the public Internet addresses of the plurality of computing devices in the private network of the organization;
   use at least one incident-origin data source that maps externally-detected security incidents to public Internet addresses from which the security incidents originated to translate the set of candidate public Internet addresses into a set of security incidents that likely originated from the private network of the organization;
   use the set of security incidents to estimate the security hygiene of the private network; and
   perform the security action based on the estimated security hygiene.

\* \* \* \* \*